(12) United States Patent  
Llewellyn

(10) Patent No.: US 7,942,167 B1
(45) Date of Patent: May 17, 2011

(54) EXPANDABLE PIPE FOR RESTORING A CONDUIT

(76) Inventor: Clinton Edward Llewellyn, Waterford, MI (US)

( * ) Notice: Subject to any disclaimer, the term of this patent is extended or adjusted under 35 U.S.C. 154(b) by 0 days.

(21) Appl. No.: 12/759,236

(22) Filed: Apr. 13, 2010

(51) Int. Cl.
*F16L 55/18* (2006.01)
(52) U.S. Cl. .......... 138/98; 138/97; 264/269; 405/150.1
(58) Field of Classification Search .............. 138/97, 138/98; 405/150.1; 264/269, 267, 36, 270; 156/294, 293
See application file for complete search history.

(56) References Cited

U.S. PATENT DOCUMENTS

| | | | | |
|---|---|---|---|---|
| 2,148,783 A | * | 2/1939 | Spaulding | 405/147 |
| 4,124,985 A | * | 11/1978 | Maimets | 405/150.1 |
| RE30,929 E | * | 5/1982 | Maimets | 405/150.1 |
| 5,002,438 A | * | 3/1991 | Strong | 405/303 |
| 5,762,450 A | * | 6/1998 | Schmager | 405/184.2 |
| 5,817,200 A | * | 10/1998 | O'ffill | 156/94 |
| 6,167,913 B1 | * | 1/2001 | Wood et al. | 138/98 |
| 7,025,580 B2 | * | 4/2006 | Heagy et al. | 425/11 |
| 2008/0047624 A1 | * | 2/2008 | Iwasaki-Higbee | 138/98 |

* cited by examiner

*Primary Examiner* — Patrick F Brinson
(74) *Attorney, Agent, or Firm* — Dickinson Wright PLLC

(57) ABSTRACT

An expandable pipe (20) for restoring a damaged conduit (22) includes a liner (24) formed of polypropylene material. The liner (24) presents exterior surface (26) defining a plurality of grooves (28) and surrounding a center opening (32). The grooves (28) contain a grout material (30) and provide for controlled placement of the grout material (30). The grooves (28) maintain the placement of the grout material (30) when sliding the expandable pipe (20) into the conduit (22). The grout material (30) includes urethane and recycled fibers (36), and expands in volume upon contact with moisture. The grout material (30) expands to fill cracks in the conduit (22). The grooves (28) also render the expandable pipe (20) bendable in width (W) at the groves for folding and transporting the expandable pipe (20) and for maneuvering around bends of the conduit (22).

30 Claims, 6 Drawing Sheets

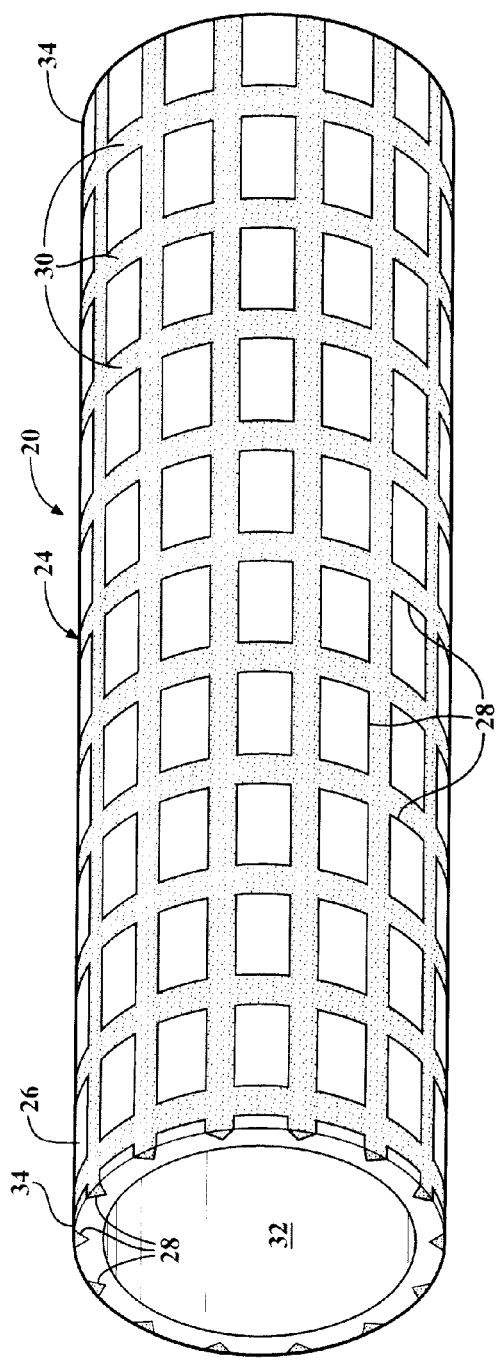
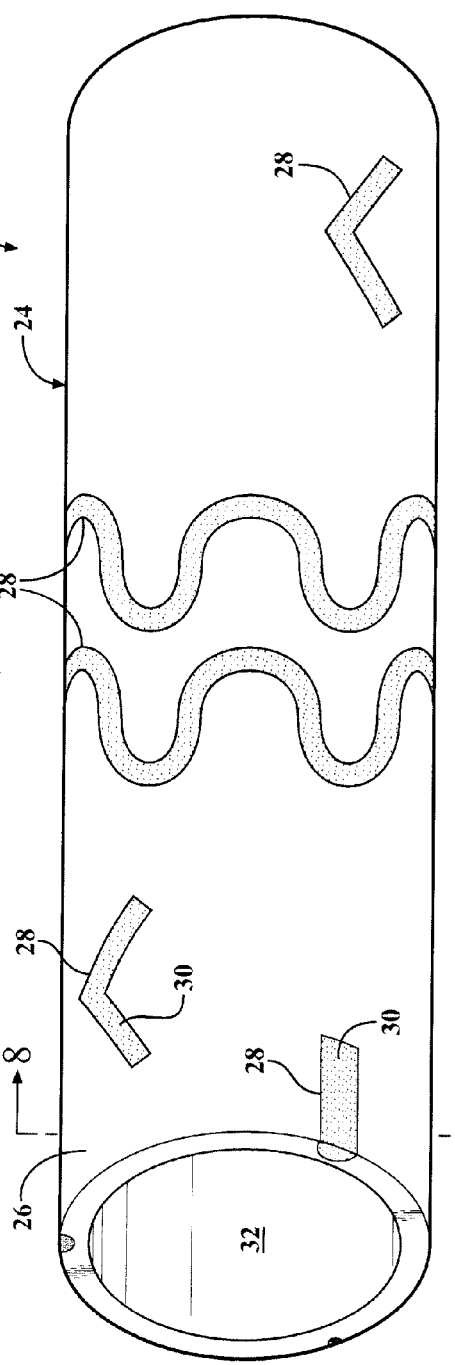
FIG. 6
FIG. 7

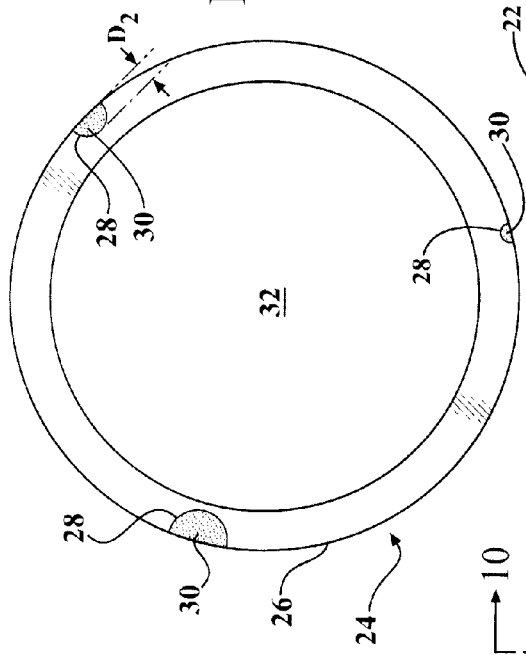
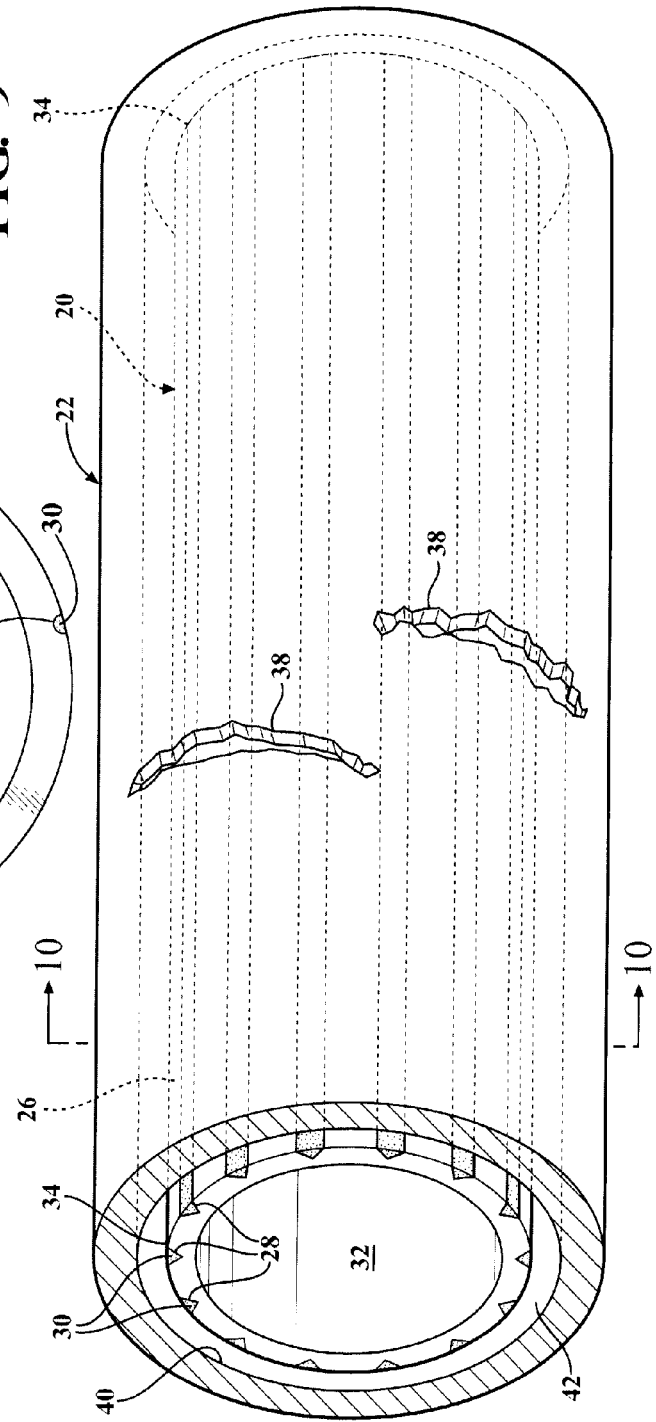

EXPANDABLE PIPE FOR RESTORING A CONDUIT

BACKGROUND OF THE INVENTION

1. Field of the Invention

The invention relates to restoration of conduits, and particularly to the use of a grout material to restore conduits.

2. Description of the Prior Art

Grout materials are often used to repair an interior surface of corroded, cracked, or otherwise damaged conduits. One method of repairing a metal conduit includes coupling short links of stainless steel sleeves to one another to form a liner, and pulling the stainless steel liner through the metal conduit with a cable to present a small annular space between the stainless steel liner and the metal conduit. A grout material is then pumped into the annular space to fill the annular space and cracks in the metal conduit. However, this method includes significant material costs and labor costs. Further, in the above method and other methods currently used, controlling the placement of the grout material is difficult. Oftentimes, the grout material is disposed unevenly along the damaged conduit and does not fill all of the cracks of the conduit.

SUMMARY OF THE INVENTION AND ADVANTAGES

An expandable pipe for restoring a conduit includes a liner presenting an exterior surface surrounding a center opening. A grout material having a dimension is disposed on the exterior surface. The grout material is expandable in the dimension upon contact with moisture. The exterior surface of the liner defines a plurality of grooves extending radially into the exterior surface for containing the grout material.

The expandable pipe is formed by providing a liner presenting an exterior surface surrounding a center opening; defining a plurality of grooves in the exterior surface of the liner; and disposing a grout material in at least one of the grooves.

A method of restoring a conduit having a interior surface surrounding a conduit opening includes providing a liner having an exterior surface surrounding a center opening; defining a plurality of grooves extending radially into the exterior surface of the liner; and disposing a grout material in at least one of the grooves. The method next includes disposing the liner in the conduit opening; and exposing the grout material to moisture so that the grout material expands and engages the interior surface of the conduit.

The grooves of the liner allow for the expandable pipe to fold for convenient transportation of the expandable pipe. The grooves also provide flexibility for maneuvering the expandable pipe around bends of the damaged conduit. The grooves of the liner also allow for controlled placement and amount of the grout material along the exterior surface of the liner. The grooves maintain the placement of the grout material as liner is disposed in the damaged conduit. The grout material expands to engage the interior surface of the damaged conduit and fills cracks, holes, indentations, or other imperfections and voids along the interior surface of the conduit, caused by corrosion, erosion, or other circumstances. In other words, the expandable pipe relines the interior surface of the damaged conduit. The expandable pipe also provides a seal to the conduit and prevents water and debris from entering the conduit. The grout material of the expandable pipe can also expand through holes in the conduit and fill voids in earth surrounding the conduit. The expandable pipe is a cost-effective and convenient way to repair and restore conduits of various types, such as sewer pipes, electrical pipes, and air ducts.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a perspective view of a forth embodiment of the expandable pipe including grooves extending circumferentially around a center opening and longitudinally between ends;

FIG. 7 is a perspective view of a fifth embodiment of the expandable pipe including grooves extending along selected sections of the liner;

FIG. 8 is an enlarged cross sectional view of the expandable pipe of FIG. 7 along line 8-8 showing grooves having different depths;

FIG. 9 is a perspective view of the expandable pipe of FIG. 1 disposed in a conduit including cracks;

DETAILED DESCRIPTION OF THE INVENTION

Figure 1:
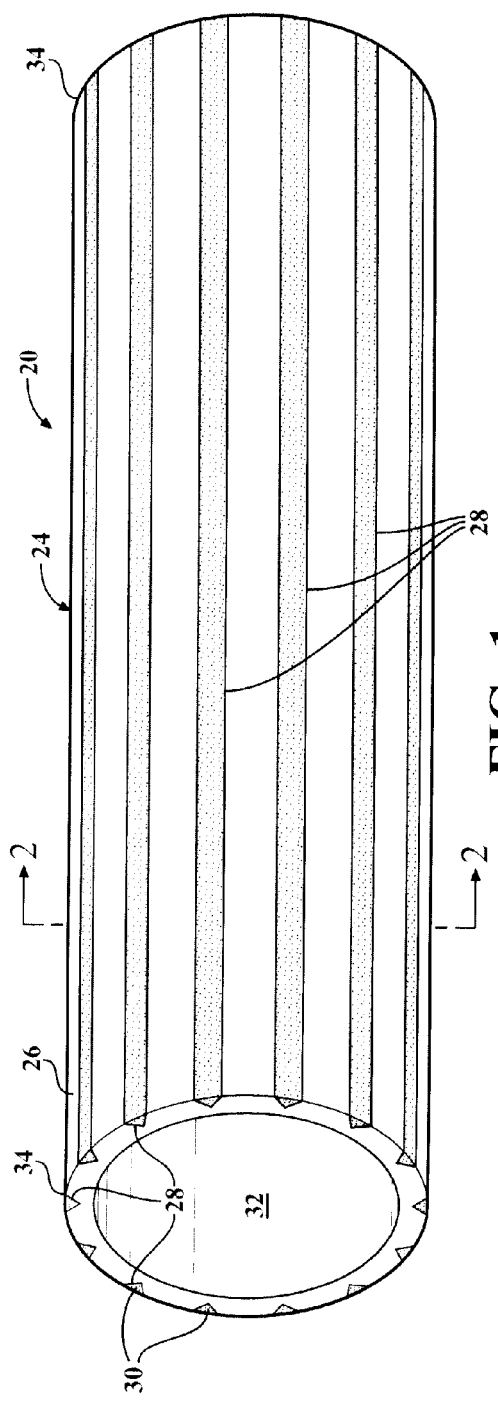
FIG. 1 is a perspective view of a first embodiment of an expandable pipe.

An expandable pipe (20) for restoring a damaged conduit (22) is shown in FIGS. 1-13. The expandable pipe (20) includes a liner (24) presenting an exterior surface (26) including a plurality of grooves (28). A grout material (30) having a dimension ($D_1$), such as volume, is disposed in the grooves (28). The grooves (28) maintain the grout material (30) in place as the liner (24) is disposed in the conduit (22). The grout material (30) expands in the dimension ($D_1$) upon contact with moisture and fills voids in the conduit (22). The grout material (30) then hardens to restore the integrity of the conduit (22).

Figure 2A:
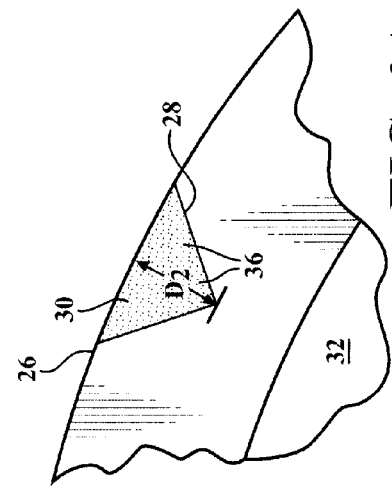
FIG. 2A is an enlarged view of a groove of FIG. 2 showing the depth of the groove.
Figure 2:
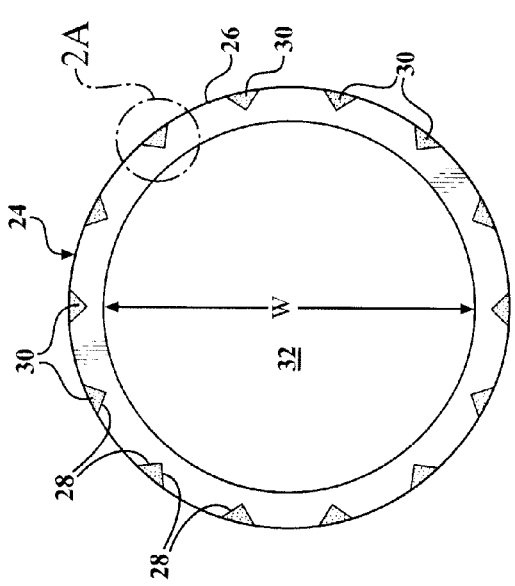
FIG. 2 is a cross sectional view of the expandable pipe of FIG. 1 along line 2-2 showing grooves having an acuate profile.
Figure 3:
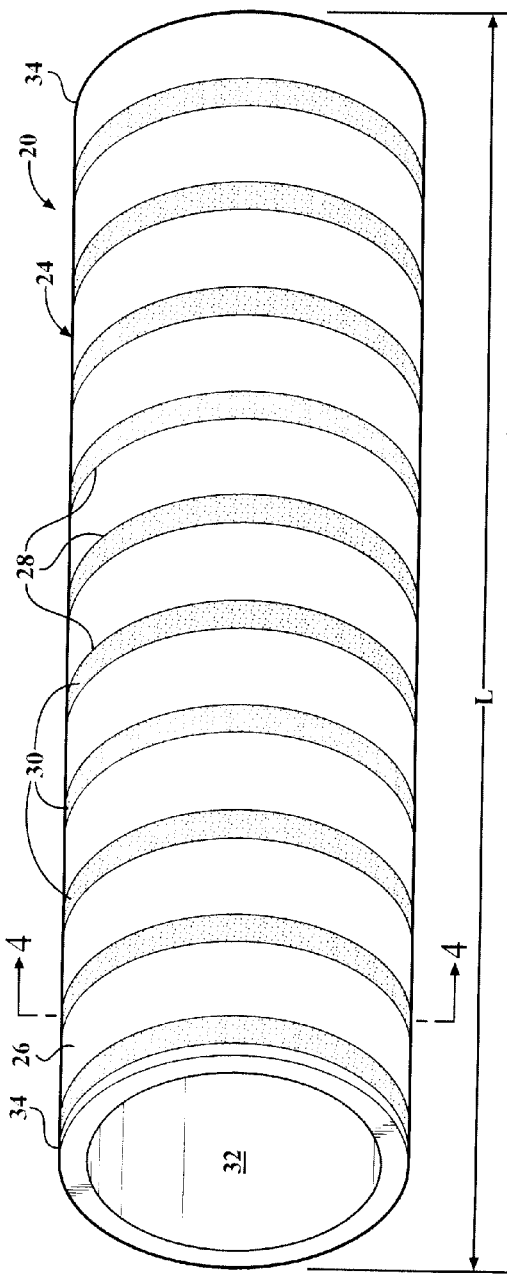
FIG. 3 is a perspective view of a second embodiment of the expandable pipe including grooves extending circumferentially around a center opening.

As alluded to above, the liner (24) presents the exterior surface (26) surrounding a center opening (32) and extending between opposite ends (34). The exterior surface (26) presents a width (W) extending across the center opening (32), as shown in FIG. 2, and a length (L) extending along the center opening (32), as shown in FIG. 3. The liner (24) is formed of a polymer material, preferably recycled polypropylene (PP). However, the liner (24) can include other polymer or elastomer materials, such as high density polyethylene (HDPE) and polyvinyl chloride (PVC). The liner (24) can also include a mixture of polymer or elastomer materials.

Figure 5:
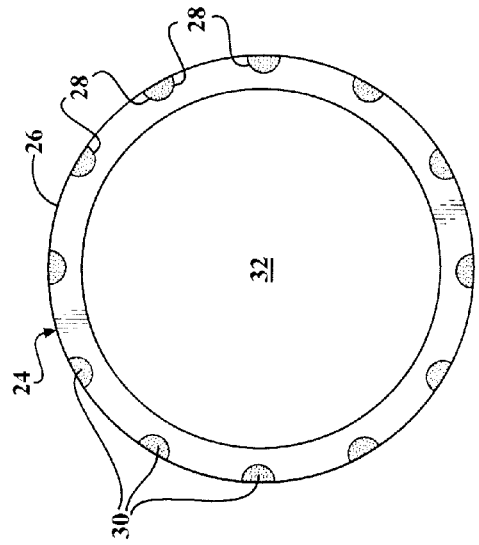
FIG. 5 is a cross sectional view of a third embodiment of the expandable pipe showing grooves having a concave profile.
Figure 4:
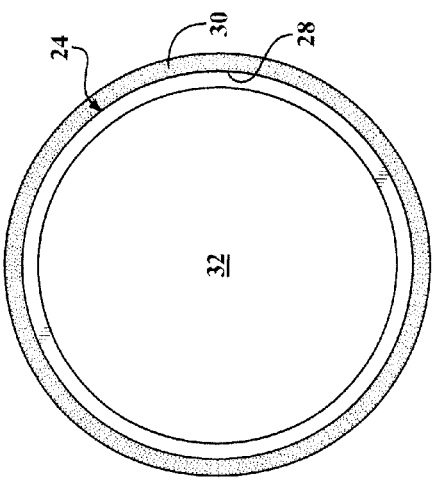
FIG. 4 is a cross sectional view of the expandable pipe of FIG. 3 along line 4-4.

The exterior surface (26) of the liner (24) defines a plurality of grooves (28) spaced from one another between the ends (34). The grooves (28) extend radially into the exterior surface (26) of the liner (24). In one embodiment, each of the grooves (28) extends longitudinally between the ends (34) along the exterior surface (26), as shown in FIG. 1. In another embodiment, each of the grooves (28) extend circumferentially around the center opening (32) along the exterior surface (26), as shown in FIG. 3. In yet another embodiment, the grooves (28) extend both circumferentially around the center opening (32) and longitudinally between the ends (34) along the exterior surface (26), as shown in FIG. 6. The grooves (28) are typically spaced an equal distance from one another around or along the expandable liner (24). In another embodiment, the grooves (28) extending circumferentially around the center opening (32) also extend helically along the exterior surface (26). In one embodiment, each groove (28) has an acuate profile, as shown in FIG. 2. In another embodiment, each groove (28) has a concave profile, as shown in FIG. 5. The grooves (28) can also include another profiled shape or profiles different from one another. Each of the grooves (28) can extend in a straight line along the exterior surface (26), as shown in FIGS. 1, 3, and 6. Alternatively, the grooves (28) can extend around the center opening (32) and along the exterior surface (26) in non-linear designs, as shown in FIG. 7.

Figure 12:
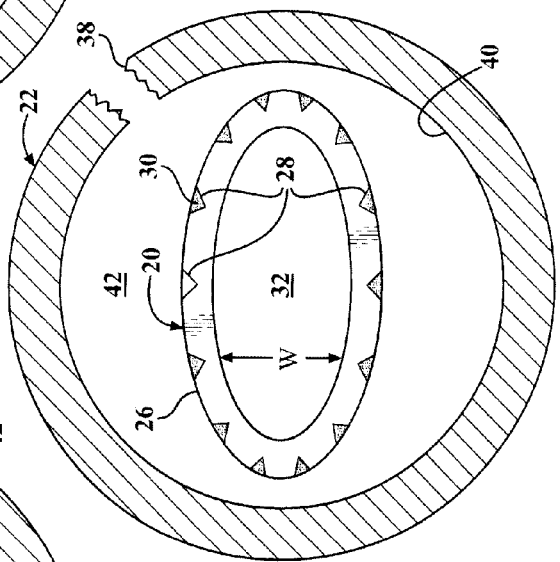
FIG. 12 is a cross sectional view of a sixth embodiment of the expandable pipe in a contracted position and disposed in a conduit.
Figure 13:
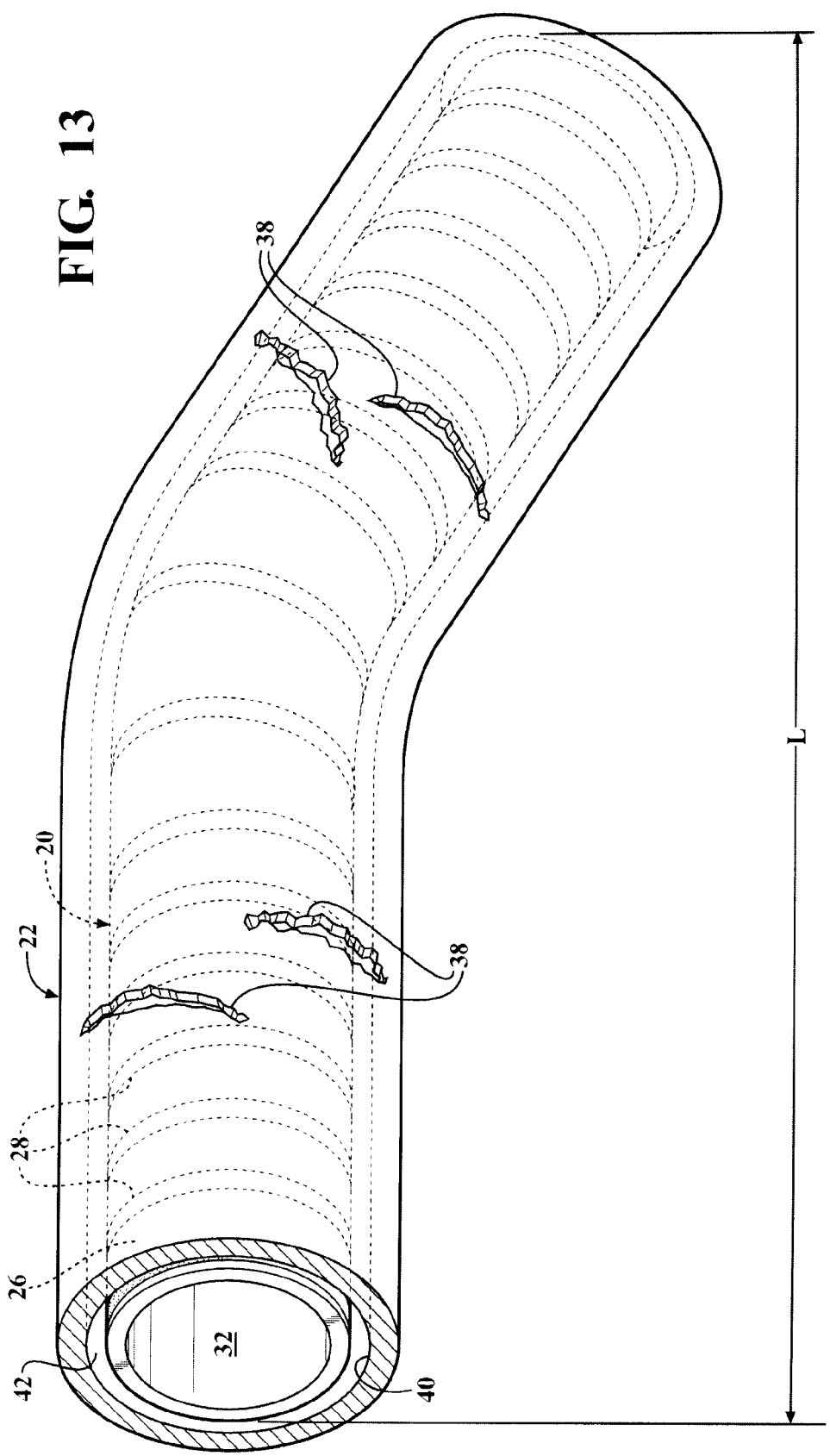
FIG. 13 is a cross perspective view of the expandable pipe of FIG. 3 disposed in a conduit including a bend and showing the liner bending in length.

The grooves (28) can be formed by cutting or stamping into the exterior surface (26) of the liner (24), or by other methods known in the art. Each of the grooves (28) extends radially into the exterior surface (26) to a depth ($D_2$), as shown in FIG. 2A, rendering the liner (24) bendable in at least one of the width (W) and the length (L) at the grooves (28). In other words, the depth ($D_2$) of the grooves (28) is great enough to allow the liner (24) to bend. If each of the grooves (28) extends longitudinally between the ends (34), then the liner (24) is bendable in the width (W), as shown in FIG. 12. If each of the grooves (28) extends circumferentially around the center opening (32), then the liner (24) is also bendable in the length (L), as shown in FIG. 13. If the grooves (28) extend both longitudinally and circumferentially, then the liner (24) is bendable in both the width (W) and the length (L). The depth ($D_2$) of the grooves (28) depends on the strength of the polymer material forming the liner (24) and the thickness of the liner (24). For example, the depth ($D_2$) of the grooves (28) is greater for liners (24) formed of polymers having greater tensile strengths than for liners (24) formed of polymers having lower tensile strengths. Also, the depth ($D_2$) of the grooves (28) is greater for liners (24) having a greater thickness than those having a lesser thickness. As shown in the Figures, the grooves (28) only extend partially through the liner (24) so that the inside of the liner (24) presents a continuous smooth surface. In other words, the liner (24) is free of holes.

The grooves (28) allow the liner (24) to contract and expand in at least one of the width (W) and length (L) at the grooves (28), between a contracted position, and an expanded position. For liners (24) including grooves (28) extending longitudinally along the exterior surface (26), the width (W) of the liner (24) in the expanded position, as shown in FIGS. 1-11, is greater than the width (W) of the liner (24) in the contracted position, as shown in FIG. 12. Similarly, the for liners (24) including grooves (28) extending circumferentially around the center opening (32), the length (L) of the liner (24) in the expanded position, as shown in FIG. 3, is greater than the length (L) of the liner (24) in the contracted position, as shown in FIG. 13. In the contracted position, the exterior surface (26) of the liner (24) presents a non-cylindrical shape around the center opening (32) between the ends (34), as shown in FIG. 12. In the expanded position, the exterior surface (26) presents a cylindrical shape around the center opening (32) between the ends (34), as shown in FIG. 2. Alternatively, the exterior surface (26) can present other distinct shapes in the expanded position, such as a rectangular prism. The grooves (28) of the liner (24) provide flexibility to the liner (24), allowing the liner (24) to bend or fold several times, which provides for convenient transportation of the liner (24), such as from a manufacturing facility to a job site. The folded expandable pipe (20) can be secured in place with a band for transportation. The grooves (28) of the liner (24) also provide flexibility for maneuvering the expandable pipe (20) around bends of the damaged conduit (22), as shown in FIG. 13.

The grooves (28) of the liner (24) also provide for controlled placement of the grout material (30). The grooves (28) can be formed to have equal volumes and be disposed equal distances from one another so that the grout material (30) is equally distributed around and along the liner (24), as shown in FIG. 1. Alternatively, the grooves (28) can be formed in only certain sections of the liner (24) so that the grout material (30) is only disposed in those sections, as shown in FIG. 7. The grooves (28) also allow a predetermined amount or dimension ($d_1$), such as volume, of the grout material (30) at or along particular sections of the expandable pipe (20). For example, a greater volume of grout material (30) may be required in one area of the expandable pipe (20) for repairing a corresponding severely damaged area of the conduit (22). As shown in FIG. 8, the liner (24) can include at least one groove (28) having a depth ($D_2$) greater than the depth ($D_2$) of the other grooves (28) for containing a greater volume of the grout material (30). Also shown in FIG. 8, the liner (24) can include a plurality of grooves (28) having depths ($D_2$) different from one another.

Figure 10:
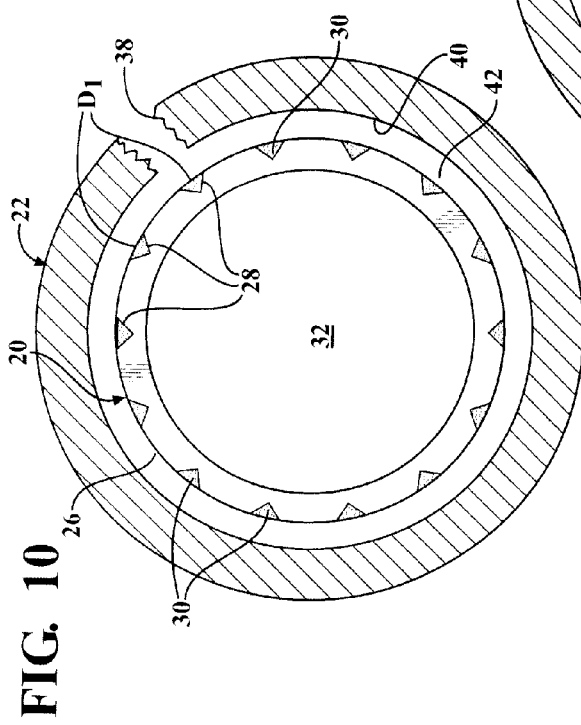
FIG. 10 is a cross sectional view of the expandable pipe and conduit of FIG. 9 along line 10-10.

As stated above, the grout material (30) is disposed in the grooves (28) of the liner (24). The grout material (30) can be disposed in each of the grooves (28), as shown in FIG. 2, or less than each of the grooves (28) of the liner (24), as shown in FIG. 12. The folding of the expandable pipe (20) is preferably performed along the grooves (28) that do not contain the grout material (30). The grout material (30) has the dimension ($D_1$), such as volume, in the grooves (28), as shown in FIG. 10. The dimension ($D_1$) of the grout material (30) in the grooves (28) depends on the length, width, and depth ($D_2$) of the grooves (28). Preferably, the grout material (30) is disposed in the grooves (28) so that the grout material (30) is flush with the exterior surface (26) of the liner (24) prior to exposure to moisture, as shown in FIGS. 2, 5, 8, and 10. The grout material (30) is flush with the exterior surface (26) so that the grout material (30) doesn't brush against the conduit (22) when the expandable pipe (20) slides into the conduit (22). Although not shown, the grout material (30) can also be disposed around the grooves (28) on the exterior surface (26) of the liner (24). The grout material (30) can be disposed on the liner (24) manually or mechanically, for example by injecting the grout material (30) into each of the grooves (28) or spraying the grout material (30) into the grooves (28). A variety of other techniques can be used to apply the grout material (30) to the liner (24). The most appropriate and cost effective technique typically depends on the number of liners (24) being manufactured during a given period of time.

The grout material (30) can be disposed in the grooves (28) of the liner (24) at a manufacturing facility, and then the liner (24) including the grout material (30) in the grooves (28) can be folded and transported to a job site where it will be installed in the damaged conduit (22). The folded expandable pipe (20), including the grout material (30) in the grooves (28), can be wrapped in a protective material and tied with a band for transportation to the job site. The protective material can include a thin plastic material, such as Saran wrap. Alternatively, the liner (24) can be folded and transported to the job site before the grout material (30) is disposed in the grooves (28). The grout material (30) can be disposed in the grooves (28) at the job site.

The grout material (30) preferably includes urethane, for example expandable natural urethane grout. The grout material can also include other types of urethane grout, epoxy grout, cement-based grout, and resin-based grout. The grout material (30) typically includes a plurality of fibers (36), as shown in FIG. 2A, such as recycled fiber glass, carbon fiber (36), and other recycled or non-recycled fibers for increasing the strength of the grout material (30). The grout material can also include a filler material, such as expandable plastic micro-spheres. In one embodiment, the grout material (30) includes the urethane and expandable plastic micro-spheres. However, the grout material (30) can include a variety of other filler materials. The grout material (30) can be pre-mixed from a variety of different materials and obtain a predetermined strength. The grout material (30) can also be pre-mixed to obtain a predetermined rate of hardening upon exposure to moisture.

As stated above, the expandable pipe (20) is disposed in a conduit (22) having at least one crack, void, hole, or other imperfection (38), as shown in FIG. 9, due to corrosion, erosion, or other circumstances. The conduit (22) typically includes an interior surface (40) having the imperfection (38) surrounding a conduit opening (42). The conduit (22) typically includes a cylindrical shape so that the conduit opening (42) has an annular shape, but the conduit (22) can include other distinct shapes. The conduit (22) can be any type of conduit (22) or pipe (20). The conduit (22) may be located in the ground, such as a sewage pipe (20), inside a building, such as an electrical pipe (20), or elsewhere. The conduit (22) is typically formed of metal, as shown in FIGS. 9-13, such as copper, aluminum, or iron. However, the conduit (22) can also be formed of plastic or another material.

The expandable pipe (20) is typically inserted into the conduit (22) by sliding the expandable pipe (20) into the conduit opening (42). The expandable pipe (20) is typically slid into the conduit opening (42) in the contracted position, as shown in FIG. 12. As stated above, in the contracted position, the exterior surface (26) of the liner (24) presents the non-cylindrical shape around the center opening (32) between the ends (34). The grooves (28) maintain the placement of the grout material (30) during transportation of the expandable pipe (20) to the job site and when sliding the liner (24) into the conduit (22). In other words, the grout material (30) does not rub against the interior surface (40) of the conduit (22) when inserting the expandable pipe (20) into the conduit (22).

After the liner (24) is disposed in the conduit (22), the liner (24) is expanded in the width (W) to the expanded position so that the exterior surface (26) of the liner (24) engages or is disposed directly adjacent the interior surface (40) of the conduit (22), as shown in FIGS. 9 and 10. In the expanded position, the exterior surface (26) of the liner (24) presents a cylindrical shape around the center opening (32) between the ends (34). The width (W) of the liner (24) in the expanded position is greater than the width (W) of the liner (24) in the contracted position. The liner (24) can be expanded by injecting air into the liner (24).

Figure 11:
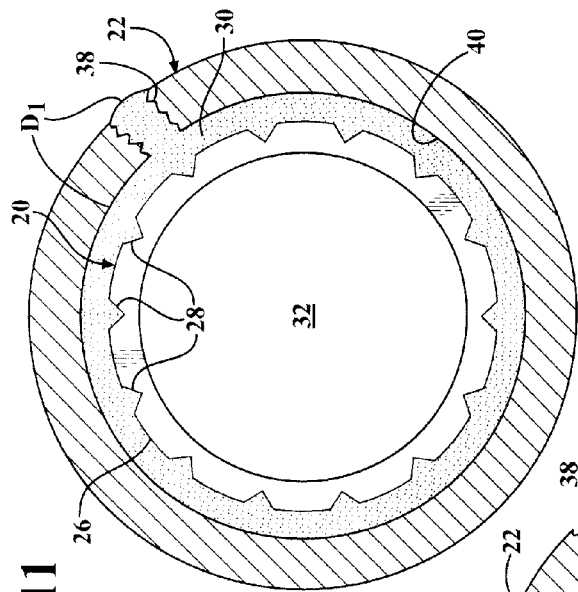
FIG. 11 is a cross sectional view of the expandable pipe and conduit of FIG. 10 upon exposure to moisture.

As stated above, upon contact with moisture, the grout material (30) expands in the dimension ($D_1$). The moisture is typically present inside the conduit (22) or naturally found in the ground. Thus, the grout material (30) typically contacts the moisture and expands in the dimension shortly after being disposed in the conduit (22). If moisture is not present in the conduit (22), then moisture can be manually applied to the grout material (30) after the liner (24) is disposed in the conduit (22). The grout material (30) typically expands in the dimension, such as volume, to fill the space between the expandable pipe (20) and conduit (22), engage the interior surface (40) of the conduit (22), and restore the integrity of the conduit (22), as shown in FIG. 11. In other words, the moisture combines with or activates the grout material (30) and causes the grout material (30) to expand in volume. The grout material (30) hardens or sets after a predetermined period of time after expanding in the dimension ($D_1$). The predetermined period of time required for the grout material (30) to harder or set depends on the type of grout material (30), amount of grout material (30), and amount of moisture contacting the grout material (30). Accordingly, the expandable pipe (20) and grout material (30) should be protected from contact with moisture prior to disposing the expandable pipe (20) in the conduit (22).

The expandable pipe (20) improves the integrity of the interior surface (40) of the damaged conduit (22). Typically, the grout material (30) relines the interior surface (40) of the damaged conduit (22). As stated above, the grooves (28) of the liner (24) allow for the controlled placement and amount of grout material (30) used to restore the conduit (22). The grout material (30) may fill holes or voids along the interior surface (40) of the conduit (22) caused by corrosion, erosion, or other circumstances. The grout material (30) may also expand through holes in the conduit (22) and fill holes in the ground surrounding the conduit (22). The grout material (30) also provides a seal to the conduit (22), preventing water and debris from entering the conduit (22), and allows fluids to flow therethrough without leaking from the conduit (22). The expandable pipe (20) is a cost-effective and convenient way to restore conduits (22).

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

ELEMENT LIST

| Element Symbol | Element Name |
| --- | --- |
| 20 | pipe |
| 22 | conduit |
| 24 | liner |
| 26 | exterior surface |
| 28 | grooves |
| 30 | grout material |
| 32 | center opening |
| 34 | ends |
| 36 | fibers |
| 38 | imperfections |
| 40 | interior surface |
| 42 | conduit opening |

-continued

| Element Symbol | Element Name |
| --- | --- |
| $d_1$ | dimension |
| $d_2$ | depth |
| l | length |
| w | width |

The invention claimed is:

1. An expandable pipe (20) for restoring a conduit (22) comprising:
   a liner (24) presenting an exterior surface (26) surrounding a center opening (32);
   a grout material (30) having a dimension ($D_1$) and disposed on said exterior surface (26);
   said grout material (30) being expandable in said dimension ($D_1$) upon contact with moisture;
   said exterior surface (26) surface of said liner (24) defining a plurality of grooves (28) extending radially into said exterior surface (26) for containing said grout material (30) in said grooves (28) prior to inserting said liner into said conduit.

2. An expandable pipe (20) as set forth in claim 1 wherein said exterior surface (26) presents a width (W) extending across said center opening (32) and wherein at least one of said grooves (28) has a depth ($D_2$) rendering said liner (24) bendable in said width (W).

3. An expandable pipe (20) as set forth in claim 2 wherein said liner (24) is contractible and expandable in said width (W) at said grooves (28) between a contracted position and an expanded position.

4. An expandable pipe (20) as set forth in claim 1 wherein said exterior surface (26) presents a length (L) extending across said center opening (32) and wherein at least one of said grooves (28) has a depth ($D_2$) rendering said liner (24) bendable in said length (L).

5. An expandable pipe (20) as set forth in claim 1 wherein said grout material (30) is disposed in each of said grooves (28).

6. An expandable pipe (20) as set forth in claim 1 wherein said grout material (30) is disposed in less than each of said grooves (28).

7. An expandable pipe (20) as set forth in claim 1 wherein said grooves (28) extend circumferentially around said center opening (32) along said exterior surface (26).

8. An expandable pipe (20) as set forth in claim 1 wherein said liner (24) extends between opposite ends (34) and said grooves (28) extend longitudinally between said ends (34) along said exterior surface (26).

9. An expandable pipe (20) as set forth in claim 1 wherein said grout material (30) disposed in said grooves (28) is flush with said exterior surface (26) of said liner (24) prior to contact with the moisture.

10. An expandable pipe (20) as set forth in claim 1 wherein at least one of said grooves (28) has a concave profile.

11. An expandable pipe (20) as set forth in claim 1 wherein at least one of said grooves (28) has an acuate profile.

12. An expandable pipe (20) as set forth in claim 1 wherein said liner (24) is formed of a polymer material.

13. An expandable pipe (20) as set forth in claim 12 wherein said polymer material includes polypropylene.

14. An expandable pipe (20) as set forth in claim 1 wherein said grout material (30) includes urethane.

15. An expandable pipe (20) as set forth in claim 1 wherein said grout material (30) includes fibers (36).

16. An expandable pipe (20) as set forth in claim 1 wherein said grout material (30) hardens after a predetermined period of time upon expanding in said dimension ($D_1$).

17. An expandable pipe (20) as set forth in claim 1 wherein said dimension ($d_1$) of said grout material (30) is volume.

18. An expandable pipe (20) for restoring a conduit (22) comprising:
   a liner (24) presenting an exterior surface (26) surrounding a center opening (32);
   said exterior surface (26) presenting a width (W) extending across said center opening (32);
   said liner (24) being formed of a polymer material;
   a grout material (30) having a dimension ($D_1$) and disposed on said exterior surface (26) of said liner (24);
   said grout material (30) being expandable in said dimension ($D_1$) upon contact with moisture;
   said dimension ($D_1$) being volume;
   said grout material (30) including urethane and recycled fibers (36);
   said exterior surface (26) defining a plurality of grooves (28) each extending radially into said exterior surface (26) for containing said grout material (30) in said grooves (28) prior to inserting said liner into said conduit; and
   each of said grooves (28) having depth ($D_2$) rendering said liner (24) bendable in said width (W).

19. A method of forming an expandable pipe (20) for restoring a conduit (22) comprising:
   providing a liner (24) presenting an exterior surface (26) surrounding a center opening (32);
   defining a plurality of grooves (28) extending radially into the exterior surface (26) of the liner (24) for containing the grout material (30) in the grooves (28); and
   disposing a grout material (30) in at least one of the grooves (28) prior to inserting said liner into said conduit.

20. A method as set forth in claim 19 wherein the step of defining a plurality of grooves (28) in the exterior surface (26) of the liner (24) includes stamping the grooves (28) radially into the exterior surface (26) of the liner (24).

21. A method as set forth in claim 19 wherein the step of disposing a grout material (30) in each of the grooves (28) includes spraying the grout material (30) into the grooves (28).

22. A method of restoring a conduit (22) comprising:
   providing a conduit (22) having a interior surface (40) surrounding a conduit opening (42);
   providing a liner (24) having an exterior surface (26) surrounding a center opening (32);
   defining a plurality of grooves (28) extending radially into in the exterior surface (26) of the liner (24) for containing the grout material (30) in the grooves (28);
   disposing a grout material (30) in at least one of the grooves (28);
   disposing the liner (24) in the conduit opening (42) after said disposing the grout material (30) in at least one of the grooves (28); and
   exposing the grout material (30) to moisture so that the grout material (30) expands and engages the interior surface (40) of the conduit (22).

23. A method as set forth in claim 22 including expanding the liner (24) in width (w) upon disposing the liner (24) in the conduit opening (42).

24. A method as set forth in claim 23 wherein the step of expanding the liner (24) in the width (W) includes inflating the liner (24) with air.

25. A method as set forth in claim 22 wherein the step of disposing the liner (24) in the conduit opening (42) includes sliding the liner (24) into the conduit opening (42).

26. An expandable pipe (20) for restoring a conduit (22) having a plurality of imperfections (38) comprising:
- a liner (24) presenting an exterior surface (26) surrounding a center opening (32);
- said exterior surface (26) presenting a width (W) extending across said center opening (32) between opposite ends (34);
- said exterior surface (26) of said liner (24) defining a plurality of grooves (28) spaced from one another between said ends (34);
- each of said grooves (28) extending radially into said exterior surface (26);
- each of said grooves (28) having depth ($D_2$) rendering said liner (24) bendable in said width (W) at said grooves (28);
- said liner (24) being contractible and expandable in said width (W) between a contracted position and an expanded position;
- said width (W) of said expanded position being greater than said width (W) of said contracted position;
- said exterior surface (26) of said liner (24) presenting a non-cylindrical shape around said center opening (32) between said ends (34) in said contracted position;
- said exterior surface (26) of said liner (24) presenting a cylindrical shape around said center opening (32) between said ends (34) in said expanded position;
- said liner (24) being formed of a polymer material;
- said polymer material being recycled polypropylene;
- a grout material (30) having a dimension ($D_1$) and disposed in each of said grooves (28) of said liner (24);
- said grout material (30) being flush with said exterior surface (26) of said liner (24) prior to contact with moisture;
- said grout material (30) being expandable in said dimension ($D_1$) upon contact the with the moisture;
- said grout material (30) hardening after a predetermined period of time upon contact with the moisture;
- said grout material (30) including urethane;
- said grout material (30) including fibers (36);
- said fibers (36) of said grout material (30) being recycled; and
- said fibers (36) of said grout material (30) including fiber glass.

27. An expandable pipe (20) as set forth in claim 26 wherein each of said grooves (28) extend circumferentially around said center opening (32) along said exterior surface (26).

28. An expandable pipe (20) as set forth in claim 26 wherein each of said grooves (28) extend longitudinally between said ends (34) along said exterior surface (26).

29. An expandable pipe (20) as set forth in claim 26 wherein each of said grooves (28) have a concave profile.

30. An expandable pipe (20) as set forth in claim 26 wherein each of said groves have an acuate profile.

* * * * *